(12) United States Patent
Jacobs et al.

(10) Patent No.: US 10,371,830 B2
(45) Date of Patent: Aug. 6, 2019

(54) RADIATION DETECTOR FOR COMBINED DETECTION OF LOW-ENERGY RADIATION QUANTA AND HIGH-ENERGY RADIATION QUANTA

(71) Applicant: KONINKLIJKE PHILIPS N.V., Eindhoven (NL)

(72) Inventors: Johannes Wilhelmus Maria Jacobs, Boxtel (NL); Jorrit Jorritsma, Veldhoven (NL); Heidrun Steinhauser, Eindhoven (NL); Onno Jan Wimmers, Valkenswaard (NL); Peter Lex Alving, Mierlo (NL); Herman Stegehuis, Best (NL); Herfried Karl Wieczorek, Aachen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 15/763,489

(22) PCT Filed: Oct. 14, 2016

(86) PCT No.: PCT/EP2016/074647
§ 371 (c)(1),
(2) Date: Mar. 27, 2018

(87) PCT Pub. No.: WO2017/067846
PCT Pub. Date: Apr. 27, 2017

(65) Prior Publication Data
US 2018/0275289 A1    Sep. 27, 2018

(30) Foreign Application Priority Data

Oct. 21, 2015    (EP) .................................... 15190722

(51) Int. Cl.
*G01T 1/00* (2006.01)
*G01T 1/20* (2006.01)
(Continued)

(52) U.S. Cl.
CPC .......... *G01T 1/2018* (2013.01); *G01T 1/1611* (2013.01); *G01T 1/1642* (2013.01); *G01T 1/2023* (2013.01)

(58) Field of Classification Search
CPC ....... G01T 1/2018; G01T 1/24; G01T 1/2928; H04N 5/32
See application file for complete search history.

(56) References Cited

U.S. PATENT DOCUMENTS 6,448,559 B1    9/2002  Saoudi
6,449,331 B1    9/2002  Nutt
(Continued)

FOREIGN PATENT DOCUMENTS

EP    2180342          4/2010
EP    2180342 A1 *    4/2010    ............. G01N 23/04
(Continued)

*Primary Examiner* — David P Porta
*Assistant Examiner* — Mamadou Faye

(57) ABSTRACT

A radiation detector for combined detection of low-energy radiation quanta and high-energy radiation quanta has a multi-layered structure. A rear scintillator layer (5) is configured to emit a burst of scintillation photons responsive to a high-energy radiation quantum being absorbed by the rear scintillator layer (5). A rear photosensor layer (6) attached to a back side of the rear scintillator layer (5) is configured to detect scintillation photons generated in the rear scintillator layer (5). A front scintillator layer (3) arranged in front of the rear scintillator layer (5) opposite the rear photosensor layer (6) is configured to emit a burst of scintillation photons responsive to a low-energy radiation quantumbeing absorbed by the front scintillator layer (3). A front photosensor layer (2) attached to a front side of the front scintil- (Continued)

lator layer (3) opposite the rear scintillator layer (5) is configured to detect scintillation photons generated in the front scintillator layer (3). The high-energy radiation quantum is a gamma ray and the low-energy radiation quantum is an X-ray.

18 Claims, 2 Drawing Sheets

(51) Int. Cl.
  *G01T 1/161* (2006.01)
  *G01T 1/164* (2006.01)
  *G01T 1/202* (2006.01)

(56) References Cited

U.S. PATENT DOCUMENTS

| | | | |
|---|---|---|---|
| 7,834,321 B2* | 11/2010 | Yorkston | G01T 1/2018 250/370.09 |
| 2002/0070365 A1 | 6/2002 | Karellas | |
| 2006/0081899 A1 | 4/2006 | Fritzler | |
| 2007/0025513 A1* | 2/2007 | Ghelmansarai | A61N 5/1049 378/98.8 |
| 2008/0011960 A1* | 1/2008 | Yorkston | G01T 1/2018 250/370.09 |
| 2010/0213381 A1 | 8/2010 | Herrmann | |
| 2011/0077511 A1 | 3/2011 | Kim | |
| 2011/0089327 A1 | 4/2011 | Vija | |
| 2011/0095191 A1* | 4/2011 | Takihi | G01N 23/04 250/366 |
| 2013/0070894 A1* | 3/2013 | Tonami | A61B 6/037 378/37 |
| 2013/0126743 A1* | 5/2013 | Iwakiri | A61B 6/4216 250/366 |
| 2013/0237818 A1* | 9/2013 | Herrmann | A61B 6/032 600/436 |

FOREIGN PATENT DOCUMENTS

| | | |
|---|---|---|
| KR | 100632139 | 9/2006 |
| WO | 2004095069 | 11/2004 |

* cited by examiner

US 10,371,830 B2

RADIATION DETECTOR FOR COMBINED DETECTION OF LOW-ENERGY RADIATION QUANTA AND HIGH-ENERGY RADIATION QUANTA

CROSS REFERENCE TO RELATED APPLICATIONS

This application is the U.S. National Phase application under 35 U.S.C. § 371 of International Application No. PCT/EP2016/074647, filed Oct. 14, 2016, published as WO 2017/067846 on Apr. 27, 2017, which claims the benefit of European Patent Application Number 15190722.7 filed Oct. 21, 2015. These applications are hereby incorporated by reference herein.

FIELD OF THE INVENTION

The present invention relates to the field of radiation detectors for combined detection of low-energy radiation quanta and high-energy radiation quanta. It finds particular application in medical imaging systems such as X-ray imaging systems as well as hybrid X-ray/nuclear imaging systems for clinical or research studies. Examples of such systems include, amongst others, spectral X-ray computed tomography scanners, interventional X-ray and scintigraphy imaging systems, hybrid single photon emission computed tomography/X-ray (SPECT/X-ray) scanners, hybrid single photon emission computed tomography/X-ray computed tomography (SPECT/CT) scanners, hybrid single photon emission computed tomography/X-ray cone beam computed tomography (SPECT/CBCT) scanners and hybrid positron emission tomography/X-ray computed tomography (PET/CT) scanners.

BACKGROUND OF THE INVENTION

Imaging systems capable of detecting radiation quanta of different energy are typically used to acquire anatomical as well as functional information of an imaging subject. For example, SPECT enables the evaluation of disease processes based on functional and metabolic information of organs and cells. By integrating X-ray computed tomography into SPECT anatomical information may be combined with functional and metabolic information. SPECT/CT scanners have proven to be valuable in oncology and are recently attracting attention for novel applications in image guided therapy.

A radiation detector for combined detection of X-rays and gamma rays has been described in U.S. Pat. No. 6,448,559 B1. The detector has a multi-layered structure with several layers arranged one behind another. The detector comprises a front scintillator layer for detecting X-rays and a rear scintillator layer for detecting gamma rays disposed behind the front scintillator layer. The multi-layered structure further includes a photosensor layer which is arranged at a back side of the rear scintillator layer opposite the front scintillator layer so as to detect scintillation photons generated in both the front and the rear scintillator layers. X-rays, due to their comparably low energy, are typically absorbed by the front scintillator layer which is arranged facing the X-ray source.

Scintillation light generated by the absorption of an X-ray in the front scintillator layer is passing through the rear scintillator layer before being detected by the photosensor. Thus, scintillation light emanating from the front scintillator layer is spread over a larger area thereby reducing spatial resolution of the X-ray CT image, e.g. by reduction of the modulation transfer function (MTF).

Document EP2180342A1 discloses an X-ray line sensor in which a scintillator layer that absorbs X-rays in a low-energy range and emits light, and a scintillator layer that absorbs X-rays in a high-energy range and emits light are brought in contact with each other.

Document US2008/011960A1 discloses a radiographic imaging apparatus for taking X-ray images of an object. In various two-panel radiographic imaging apparatus configurations, a front panel and back panel have substrates, arrays of signal sensing elements and readout devices, and passivation layers. The front and back panels have scintillating phosphor layers responsive to X-rays passing through an object produce light which illuminates the signal sensing elements to provide signals representing X-ray images.

Document US2002/070365 discloses a system for spectroscopic imaging of bodily tissue in which a scintillation screen and a charged coupled device (CCD) are used to image selected tissue. An x-ray source generates x-rays which pass through a region of a subject's body, forming an x-ray image which reaches the scintillation screen.

Document US2013/126743 discloses a radiation detector that includes a scintillator layer, a first photoelectric conversion layer, a second photoelectric conversion layer, and one board or two boards. The first photoelectric conversion layer absorbs at least light of a first wavelength and converts the light to charges. The second photoelectric conversion layer absorbs more light of a second wavelength than of light of the first wavelength and converts the light to charges.

SUMMARY OF THE INVENTION

It would be advantageous to improve the spatial resolution of a low-energy radiation image acquired by a radiation detector having a multi-layered structure.

To better address this concern, in a first aspect of the invention a radiation detector for combined detection of low-energy radiation quanta and high-energy radiation quanta is presented, the radiation detector having a multi-layered structure comprising:

a rear scintillator layer configured to emit a burst of scintillation photons responsive to a high-energy radiation quantum being absorbed by the rear scintillator layer;

a rear photosensor layer attached to a back side of the rear scintillator layer, said rear photosensor layer configured to detect scintillation photons generated in the rear scintillator layer;

a front scintillator layer arranged in front of the rear scintillator layer opposite the rear photosensor layer, said front scintillator layer configured to emit a burst of scintillation photons responsive to a low-energy radiation quantum being absorbed by the front scintillator layer; and a front photosensor layer attached to a front side of the front scintillator layer opposite the rear scintillator layer, said front photosensor layer configured to detect scintillation photons generated in the front scintillator layer.

According to another aspect of the invention an imaging system is presented, the imaging system comprising an X-ray source and a radiation detector for combined detection of low-energy radiation quanta and high-energy radiation quanta, the radiation detector having a multi-layered structure comprising:

a rear scintillator layer configured to emit a burst of scintillation photons responsive to a high-energy radiation quantum being absorbed by the rear scintillator layer;

a rear photosensor layer attached to a back side of the rear scintillator layer, said rear photosensor layer configured to detect scintillation photons generated in the rear scintillator layer;

a front scintillator layer arranged in front of the rear scintillator layer opposite the rear photosensor layer, said front scintillator layer configured to emit a burst of scintillation photons responsive to a low-energy radiation quantum being absorbed by the front scintillator layer; and a front photosensor layer attached to a front side of the front scintillator layer opposite the rear scintillator layer, said front photosensor layer configured to detect scintillation photons generated in the front scintillator layer.

According to the present invention the radiation detector has a multi-layered structure, wherein the layers of the multi-layer structure—namely the front photosensor layer, the front scintillator layer, the rear scintillator layer and the rear photosensor layer—are preferably arranged one behind another in the direction of incident radiation. The incident radiation may comprise low-energy radiation quanta and high-energy radiation quanta, wherein the low-energy radiation quanta have a lower energy than the high-energy radiation quanta. For example, the incident radiation may comprise low-energy X-rays and high-energy X-rays, wherein the low-energy X-rays have a lower energy that the high-energy X-rays. Another example of incident radiation detectable by the inventive radiation detector comprises X-rays and gamma rays, wherein the X-rays have a lower energy than the gamma rays. In this latter example the X-ray quanta may have an energy in the range 20 keV to 120 keV, and the gamma ray quanta may have an energy in the range 120 keV to 2 MeV.

The low-energy radiation quanta of the incident radiation will be absorbed in the front scintillator layer whereas the high-energy radiation quanta of the incident radiation will pass the front scintillator layer before being stopped in the rear scintillator layer. Scintillation photons generated in the rear scintillator layer may be detected by the rear photosensor layer which is arranged close to the rear scintillator layer. In the front scintillator layer, the highest density of scintillation photons generated by low-energy radiation quanta occurs in a peripheral area of the front scintillator layer close to the sensitive surface of the front photosensor layer. According to the present invention, scintillation photons generated by low-energy radiation quanta can be detected at a position close to the position they have been generated at, thus improving spatial resolution of the low-energy radiation; e.g. in terms of MTF.

According to a preferred embodiment of the invention the high-energy radiation quantum is a gamma ray and the low-energy radiation quantum is an X-ray. Gamma rays typically are generated by gamma decay from radioisotopes, whereas X-rays typically are generated by an X-ray source, e.g. an X-ray tube, wherein electrons collide with a metal target thereby producing X-rays. It is to be noted that in general X-rays may be generated having a higher energy than gamma rays of certain radioisotopes. However for the purpose of the aforementioned preferred embodiment of the invention it is to be assumed that the X-rays have a lower energy than the gamma rays. According to an alternate preferred embodiment of the invention the high-energy radiation quantum is a high-energy X-ray and the low-energy radiation quantum is a low-energy X-ray, wherein the high-energy X-ray has a higher energy than the low-energy X-ray.

According to a preferred embodiment of the invention, the front photosensor layer is arranged at an irradiation side of the radiation detector, wherein the irradiation side of the radiation detector is configured to receive low-energy radiation quanta and/or high-energy radiation quanta.

According to another preferred embodiment of the present invention, the rear scintillator layer comprises sodium iodide (NaI), gadolinium oxyorthosilicate (GSO), lutetium gadolinium oxyorthosilicate, lutetium oxyorthosilicate (LSO), lutetium yttrium oxyorthosilicate (LYSO), lutetium pyrosilicate (LPS), bismuth germinate (BGO), lanthanum bromide (LaBr) and/or the front scintillator layer comprises cesium iodide (CsI), gadolinium oxysulfide (GOS), calcium tungstate or cadmium tungstate (CWO). It is possible to choose different scintillator materials for the front scintillator layer and the back scintillator layer so as to optimize the front scintillator layer for the detection of X-rays and the rear scintillator layer for the detection of gamma rays. The front scintillator layer may have a lower thickness, measured in a direction perpendicular to a main plane of the front scintillator layer, as compared to the thickness of the rear scintillator layer. In one contemplated arrangement the front scintillator layer may have a thickness in the range 100-700 microns and the rear scintillator may have a thickness in the range 800-30000 microns, or 1 mm-30 mm. This arrangement may for example be used to detect X-rays, i.e. low energy radiation quanta, with the front scintillator layer, and gamma rays, i.e. high energy radiation quanta, the high energy radiation quanta having higher energy than the low energy radiation quanta, with the rear scintillator. In this arrangement the gamma rays may for example be 140 keV radiation quanta from Tc-99m, or radiation quanta from I-123 (159 keV), I-131 (365 keV), Y-90 (broad bremsstrahlung, peak at 1 MeV), Ho-166 (81 keV) or Lu-177 (208 keV).

According to another preferred embodiment of the present invention, the rear scintillator layer and the front scintillator layer comprise the same material, in particular sodium iodide (NaI), gadolinium oxyorthosilicate (GSO), lutetium gadolinium oxyorthosilicate, lutetium oxyorthosilicate (LSO), lutetium yttrium oxyorthosilicate (LYSO), lutetium pyrosilicate (LPS), bismuth germinate (BGO), lanthanum bromide (LaBr), cesium iodide (CsI), gadolinium oxysulfide (GOS), calcium tungstate or cadmium tungstate (CWO). Implementing the rear scintillator layer and the front scintillator layer with identical material facilitates manufacturing of the radiation detector.

Preferably, the rear scintillator layer and/or the front scintillator layer comprise a monolithic scintillator. With a rear and/or front scintillator layer comprising a monolithic scintillator, preferably consisting of a monolithic scintillator, it is not required to saw scintillator crystals and mount them separately, thereby reducing manufacturing costs.

According to an alternate preferred embodiment of the present invention, the rear scintillator layer and/or the front scintillator layer comprise a pixelated scintillator. The pixelated scintillator may comprise a multitude of separate scintillation crystals which may optionally be optically isolated from neighboring scintillation crystals of the pixelated scintillator, thereby reducing light sharing between pixels.

According to another preferred embodiment of the present invention, the radiation detector further comprises an optical decoupling layer interposed between the rear scintillator layer and the front scintillator layer. The optical decoupling layer may include two opposite faces that are configured to reflect scintillation photons. In other words, the optical decoupling layer may be configured to reflect scintillation photons generated in the rear scintillator layer back to the rear scintillator layer and to reflect scintillation photons generated in the front scintillator layer back to the front scintillator layer. By arranging the optical decoupling layer between the front scintillator layer and the rear scintillator layer sharing of scintillation light between the front scintillator layer and the rear scintillator layer may be suppressed.

It is preferred that the optical decoupling layer is configured to be transparent to the high-energy radiation quanta, in particular gamma rays, so as not to influence the detection of the high-energy radiation quanta, in particular gamma rays, by the rear scintillator layer and the rear photosensor. The optical decoupling layer may thus be used to improve spectral differentiation. The optical decoupling layer may e.g. comprise a metal such as aluminum although other metals are also suitable for this purpose. The optical decoupling layer may have a thickness of less than 1 mm, preferably of less than 0.5 mm.

According to another preferred embodiment of the present invention, the optical decoupling layer is integrally formed with the rear scintillator layer or integrally formed with the front scintillator layer. Having the optical decoupling layer integrally formed with one of the scintillator layers further reduces manufacturing efforts. The decoupling layer may in particular be grown in a combined manufacturing process together with the front or rear scintillator layer. Alternatively, the decoupling layer may be applied to the front scintillator layer of the rear scintillator layer in the form of a coating. Further alternatively, a separate decoupling layer may be interposed between the front scintillator layer and the rear scintillator layer, e.g. in the form of a foil, in particular comprising a metal.

According to another preferred embodiment of the present invention, the front photosensor layer comprises a foil substrate. By employing a front photosensor layer comprising a foil substrate the detection efficiency of the radiation detector may be increased due to reduced absorption of radiation quanta in the front photosensor layer. In addition, the front photosensor layer may be implemented in a curved fashion. Preferably the foil substrate has a thickness of less than 0.5 mm, in particular a thickness of less than 0.1 mm. Additionally or alternatively, the rear photosensor layer may comprise a foil substrate. Preferably, the front photosensor layer and/or the rear photosensor layer may comprise a thin-film-transistor detector on a foil substrate.

According to another preferred embodiment of the present invention, the rear photosensor layer comprises a photomultiplier, an avalanche photodiode, a thin-film-transistor detector or a silicon photomultiplier and/or the front photosensor layer comprises a thin-film-transistor detector, a CMOS image sensor or a silicon photomultiplier. In case a thin-film-transistor detector is used, the thin-film-transistor detector preferably comprises a large-area thin-film-transistor backplane two-dimensional pixel array with photodiodes on a glass or a plastic foil substrate. If silicon photomultipliers are used they either can be analog silicon photomultipliers or digital silicon photomultipliers. Digital silicon photomultipliers integrate an array of single photon avalanche diodes, also known as Geiger-mode avalanche photodiodes (GM-APD), together with the readout circuits on one chip. It is preferred that the front and rear photosensor layers comprise a plurality of photosensors, in particular an array of photosensors.

Preferably, the rear photosensor is directly attached to the back side of the rear scintillator layer and the front photosensor layer is directly attached to the front side of the front scintillator layer. According to an alternate preferred embodiment of the invention, the rear photosensor layer is attached to a back side of the rear scintillator layer via a light guide layer and/or the front photosensor layer is attached to a front side of the front scintillator layer via a light guide layer. The light guide may allow the scintillation light to be spread onto a larger or smaller sensitive area of the respective photosensor.

According to another preferred embodiment of the present invention the pixel pitch of the rear photosesor layer of the radiation detector is defined in relation to the pixel pitch of the front photosensor layer. In this embodiment the rear photosensor layer comprises a two-dimensional array of pixels having a rear photosensor layer pixel pitch in each of the two dimensions, and the front photosensor layer comprises a two-dimensional array of pixels having a front photosensor layer pixel pitch in each of the two dimensions. Moreover the rear photosensor layer pixel pitch is unequal to the front photosensor layer pixel pitch. This allows different resolution images to be generated by the front and rear photosensor layers which can reduce the image processing burden. Preferably the rear photosensor layer pixel pitch is an integer, N, multiple of the front photosensor layer pixel pitch, the integer multiple being unequal to one. In so doing a higher resolution image can be provided by the front photosensor layer as compared to the rear photosensor layer. Consequently the image processing from the rear photosensor layer is simplified. Moreover the integer multiple allows for a common collimator to be used for both the image provided by the rear photosensor layer as well as for the image provided by the front photosensor layer.

According to another preferred embodiment of the present invention, the radiation detector further comprises a collimator layer for collimating incident low-energy radiation quanta and high-energy radiation quanta, wherein the collimating layer is arranged in front of the front photosensor layer opposite the front scintillator layer. The collimator layer reduces low-energy radiation and high-energy radiation scatter, in particular X-ray and gamma ray scatter. When used to reduce gamma ray scatter, a collimator layer having a two-dimensional array of apertures that extend in mutually orthogonal directions is preferred. Such an arrangement is preferable over a one-dimensional array that is conventionally used to reduce X-ray scatter alone because the two dimensional array of septa, or walls that define the two-dimensional array of apertures reduce scatter in mutually orthogonal directions.

According to another preferred embodiment of the present invention, the imaging system is a medical imaging system such as an X-ray imaging system or a hybrid X-ray/nuclear imaging system for clinical or research studies. Particularly preferred the imaging system is a spectral X-ray computed tomography scanner, an interventional X-ray and scintigraphy imaging system, a hybrid single photon emission computed tomography/X-ray (SPECT/X-ray) scanner, a hybrid single photon emission computed tomography/X-ray computed tomography (SPECT/CT) scanner, a hybrid single photon emission computed tomography/X-ray cone beam computed tomography (SPECT/CBCT) scanner or a hybrid positron emission tomography/X-ray computed tomography (PET/CT) scanner.

According to another preferred embodiment of the present invention, the radiation detector is arranged such that the front photosensor layer is between the X-ray source and the front scintillator layer, thereby improving the detection of X-rays absorbed close to the surface of the front scintillator layer.

These and other aspects of the invention will be apparent from and elucidated with reference to the embodiments described hereinafter.

DETAILED DESCRIPTION OF EMBODIMENTS

Figure 1:
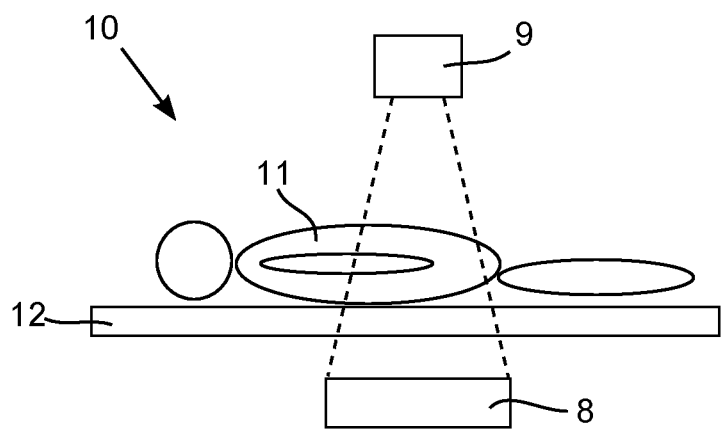
FIG. 1 is a diagrammatic sectional view of an imaging system in accordance with an embodiment of the invention.
Figure 2:
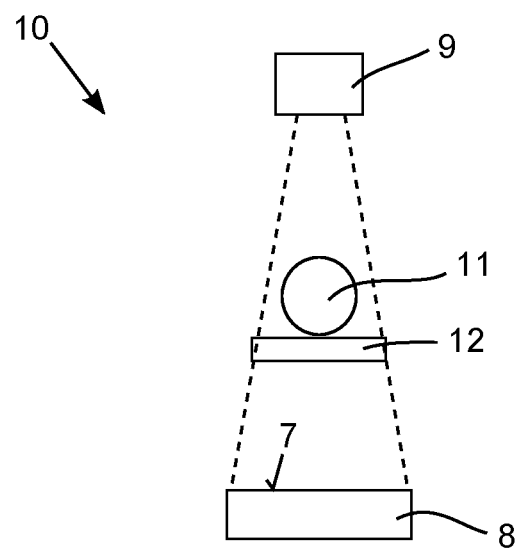
FIG. 2 is another diagrammatic sectional view of the imaging system of FIG. 1.

FIG. 1 and FIG. 2 illustrate an embodiment of an imaging system 10 in the form of a SPECT/CT medical imaging system. The imaging system 10 may be employed in image guided therapy applications, in particular in interventional oncology (e.g. selective internal radiation therapy). The imaging system 10 is both capable of X-ray and gamma ray imaging so as to generate an X-ray transmission image as well as a gamma ray emission image. Image acquisition may be carried out concurrently or one after the other.

The imaging system 10 comprises an X-ray source 9 and a radiation detector 8 for combined detection of X-rays and gamma rays. An examination region is defined between the X-ray source 9 and the radiation detector 8. The source 9 and the detector 8 may be arranged on a gantry (not depicted) that supports the source 9 and the detector 8. The gantry may optionally rotate both the source 9 and the detector 8 simultaneously to acquire transmission and/or emission images of the examination region in different directions.

A patient 11 is situated on a patient support 12. A radiotracer, e.g. iodine-123, technetium-99 or Yttrium-90 in the form of radioactive microspheres is administered to the patient 11. The radiotracer is emitting gamma rays that are detected by the radiation detector 8 in addition to the X-rays generated by the X-ray source 9.

Figure 3:
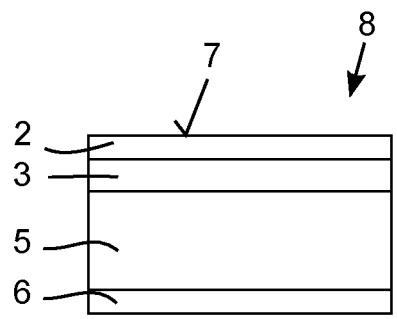
FIG. 3 is a diagrammatic illustration of radiation detector in accordance with a first embodiment of the invention.

FIG. 3 depicts a first embodiment of a radiation detector 8 for combined detection of low-energy radiation quanta in the form of X-rays and high-energy radiation quanta in the form of gamma rays according to the invention. The detector 8 has a multi-layered structure including four layers 2, 3, 5, 6 that are arranged one behind another. The radiation detector 8 has an irradiation surface 7 that is facing the X-ray source 9. Thus, in operation, X-rays and gamma rays enter the radiation detector via the irradiation surface 7 which is disposed on an irradiation side of the radiation detector 8.

A front photosensor layer 2 is arranged facing the X-ray source 9. A light sensitive surface of the front photosensor layer 2 is coupled to a front scintillator layer 3. Preferably, the front photosensor layer 2 is directly coupled to the front scintillator layer 3. However, a light guide may optionally be disposed between the front photosensor layer 2 and the front scintillator layer 3. The front photosensor layer 2 comprises a thin-film-transistor detector. The front photosensor layer 2 is configured to detect scintillation photons generated in the front scintillator layer 3.

The front scintillator layer 3 is configured to emit a burst of scintillation photons responsive to an X-ray being absorbed by the front scintillator layer 3. The front scintillator layer is preferably a CsI scintillator. However, other scintillator materials may be contemplated alternatively. The front scintillator layer 3 may be monolithic or pixelated. The front scintillator layer 3 is attached to the light sensitive side of the front photosensor layer 2 so as to enable the front photosensor layer 2 to detect scintillation photons generated in the front scintillator layer 3.

Behind the front scintillator layer 3 a rear scintillator layer 5 is arranged, opposite the front photosensor layer 2. The rear scintillator layer 5 is optimized for stopping gamma rays that typically have a higher energy compared to X-rays. The rear scintillator layer 5 is configured to emit a burst of scintillation photons responsive to a gamma ray being absorbed by the rear scintillator layer. Preferably, the rear scintillator layer 5 is implemented as a monolithic gadolinium oxyorthosilicate scintillator. However, other scintillator materials and pixelated scintillators may be contemplated alternatively.

A rear photosensor layer 6 is attached to a back side of the rear scintillator layer 5, said rear photosensor layer 6 being configured to detect scintillation photons generated in the rear scintillator layer 5. A light sensitive surface of the rear photosensor layer 6 is coupled to the rear scintillator layer 5. Thus, the light sensitive surfaces of both the rear photosensor layer 6 and the front photosensor layer 2 are directed towards another. Preferably, the rear photosensor layer 6 is directly coupled to the rear scintillator layer 5. However, a light guide may optionally be disposed between the rear photosensor layer 6 and the rear scintillator layer 5. The rear photosensor layer 6 comprises an array of digital silicon photomultipliers. The rear photosensor layer 6 is configured to detect scintillation photons generated in the rear scintillator layer 5.

In the multi-layered structure of the aforementioned radiation detector 8 the highest density of X-ray generated scintillation photons occurs in a peripheral area of the front scintillator layer 3 close to the light sensitive surface of the front photosensor layer 2. The X-ray generated scintillation photons can be detected at a position closer to the position they have been generated at, thus improving spatial resolution of the X-ray image; e.g. in terms of MTF. A further benefit of the specific multi-layered structure is that the front scintillator layer 3 and the rear scintillator layer 5 may be sealed with a common sealing structure. This is of increased importance since a lot of suitable scintillator materials are hygroscopic and therefore are required to be sealed against moisture.

In the radiation detector 8 according to the first embodiment the rear photosensor layer 6 will not only detect scintillation photons emanating from the rear scintillator layer 5 but also scintillation photons generated in the front scintillator layer 3 which propagate through the rear scintillator layer 5 towards the sensitive surface of the rear photosensor layer 6. Conversely, the front photosensor layer 2 will detect scintillation photons generated in the rear scintillator layer 5 which pass the front scintillator layer 3 towards the front photosensor layer 2. This implies the risk of cross-contamination of the gamma ray image with part of the X-ray image and vice versa. The risk of cross-contamination can be mitigated by sequentially activating the front photosensor layer 2 and the rear photosensor layer 6 in order to sequentially acquire an X-ray image and a gamma image. For example, the rear photosensor layer 6 may start gamma image acquisition only after X-ray exposure and detection of the X-ray image by the front photosensor layer 2.

Figure 4:
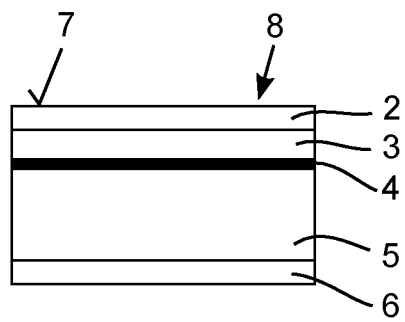
FIG. 4 is a diagrammatic illustration of radiation detector in accordance with a second embodiment of the invention.

FIG. 4 depicts a radiation detector 8 according to second embodiment of the invention. The detector 8 according to the second embodiment has a multi-layered structure including five layers 2, 3, 4, 5, 6 that are arranged one behind another. As with the radiation detector 8 of the first embodiment an irradiation surface 7 of the radiation detector 8 is facing the X-ray source 9. Thus, in operation, X-rays and gamma rays enter the radiation detector 8 via the irradiation surface 7 which is disposed on an irradiation side of the radiation detector 8.

In addition to the aforementioned layers, namely the front photosensor layer 2, the front scintillator layer 3, the rear scintillator layer 5 and the rear photosensor layer 6, the radiation detector 8 comprises an optical decoupling layer 4 interposed between the front scintillation layer 3 and the rear scintillation layer 5. By the optical decoupling layer 4 between the front scintillator layer 3 and the rear scintillator layer 5 sharing of scintillation light may be suppressed. The optical decoupling layer is transparent for gamma rays so as not to reduce gamma ray detection in the rear scintillator layer 5 significantly.

The optical decoupling layer may be a separate optical reflector layer, e.g. a Vikuiti® sheet. Alternatively, the optical decoupling layer may be integrally formed with either the front scintillator layer 3 or the rear scintillator layer 5, e.g. by first growing the material of the respective scintillator layer 3, 5 and in the following growing the optical decoupling layer in a common process. For example the front scintillator 3 may be a cesium iodine scintillator on which Aluminum is grown as the decoupling layer 4.

Figure 5:
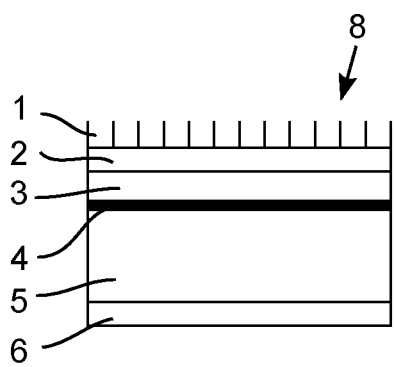
FIG. 5 is a diagrammatic illustration of radiation detector in accordance with a third embodiment of the invention.

FIG. 5 depicts a radiation detector 8 according to a third embodiment of the invention. The detector 8 according to the third embodiment has a multi-layered structure including six layers 1, 2, 3, 4, 5, 6 that are arranged one behind another. As with the radiation detector 8 of the first and second embodiments an irradiation surface 7 of the radiation detector 8 is facing the X-ray source 9.

In addition to the aforementioned layers, namely the front photosensor layer 2, the front scintillator layer 3, the optical decoupling layer 4, the rear scintillator layer 5 and the rear photosensor layer 6, the radiation detector 8 comprises a collimator layer 1. The collimator layer 1 is arranged at the irradiation side of the radiation detector 8, thus facing the X-ray source 9, thereby reducing X-ray and gamma ray scatter.

The aforementioned embodiments of radiation detectors 8 may also be used for combined detection of low-energy X-rays and high-energy X-rays in an imaging system 10 in the form of an X-ray scanner, in particular a spectral CT scanner or a spectral CBCT scanner. When using a radiation detector 8 according to the invention in such an imaging system 10, it is preferred that either one of or both the front photosensor layer 2 and the rear photosensor layer 6 comprise a thin-film-transistor detector, in particular a large area thin-film-transistor backplane two-dimensional pixel array with photodiodes on a glass or a plastic substrate.

The aforementioned embodiments of radiation detectors 8 all have a multi-layered structure and comprise a rear scintillator layer 5 configured to emit a burst of scintillation photons responsive to a high-energy radiation quantum being absorbed by the rear scintillator layer 5. In addition, they comprise a rear photosensor layer 6 attached to a back side of the rear scintillator layer 5, said rear photosensor layer 6 configured to detect scintillation photons generated in the rear scintillator layer 5. A front scintillator layer 3 is arranged in front of the rear scintillator layer 5 opposite the rear photosensor layer 6, said front scintillator layer 3 is configured to emit a burst of scintillation photons responsive to a low-energy radiation quantum being absorbed by the front scintillator layer 3. Finally, a front photosensor layer 2 is attached to a front side of the front scintillator layer 3 opposite the rear scintillator layer 5, said front photosensor layer 2 being configured to detect scintillation photons generated in the front scintillator layer 3.

While the invention has been illustrated and described in detail in the drawings and foregoing description, such illustration and description are to be considered illustrative or exemplary and not restrictive; the invention is not limited to the disclosed embodiments. For example, it is possible to operate the invention in an embodiment wherein the imaging system is a PET/CT, a SPECT/PET/CT scanner, an interventional X-ray and scintigraphy imaging system, a SPECT/X-ray scanner, a SPECT/CBCT scanner, a spectral CT scanner or a spectral CBCT scanner. Other variations to the disclosed embodiments can be understood and effected by those skilled in the art in practicing the claimed invention, from study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A radiation detector for combined concurrent detection of low-energy radiation quanta and high-energy radiation quanta, the radiation detector having a multi-layered structure, comprising:
   a rear scintillator layer configured to emit a burst of scintillation photons responsive to a high-energy radiation quantum being absorbed by the rear scintillator layer;
   a rear photosensor layer attached to a back side of the rear scintillator layer, said rear photosensor layer including a two-dimensional array of pixels having a rear photosensor layer pixel pitch in each of the two dimensions configured to detect scintillation photons generated in the rear scintillator layer;
   a front scintillator layer arranged in front of the rear scintillator layer opposite the rear photosensor layer, said front scintillator layer configured to emit a burst of scintillation photons responsive to a low-energy radiation quantum being absorbed by the front scintillator layer; and
   a front photosensor layer attached to a front side of the front scintillator layer opposite the rear scintillator layer, said front photosensor layer including a two-dimensional array of pixels having a front photosensor layer pixel pitch in each of the two dimensions configured to detect scintillation photons generated in the front scintillator layer;
   wherein the high-energy radiation quanta pass through the front scintillation layer and the front photosensor layer before being absorbed by the rear scintillation layer;
   wherein the high-energy radiation quanta are gamma rays and the low-energy radiation quanta are X-rays; and
   wherein the rear photosensor layer pixel pitch is unequal to the front photosensor layer pixel pitch.

2. The radiation detector according to claim 1 wherein the X-ray has an energy in the range 20 keV to 120 keV, and the gamma ray has an energy in the range 120 keV to 2 MeV.

3. The radiation detector according to claim 1, wherein the front photosensor layer is arranged at an irradiation side of the radiation detector, wherein the irradiation side of the radiation detector is configured to receive low-energy radiation quanta and/or high-energy radiation quanta.

4. The radiation detector according to claim 1, wherein the rear scintillator layer comprises at least one material selected from the group: sodium iodide, gadolinium oxyorthosilicate, lutetium gadolinium oxyorthosilicate, lutetium oxyorthosilicate, lutetium yttrium oxyorthosilicate, lutetium pyrosilicate, bismuth germinate, lanthanum bromide and/or the front scintillator layer comprises at least one material selected from the group: cesium iodide, gadolinium oxysulfide, calcium tungstate, cadmium tungstate.

5. The radiation detector according to claim 1, wherein the rear scintillator layer and the front scintillator layer comprise the same material.

6. The radiation detector according to claim 1, wherein the rear scintillator layer and/or the front scintillator layer comprise a monolithic scintillator.

7. The radiation detector according to claim 1, wherein the rear scintillator layer and/or the front scintillator layer comprise a pixelated scintillator.

8. The radiation detector according to claim 1, further comprising an optical decoupling layer interposed between the rear scintillator layer and the front scintillator layer.

9. The radiation detector according to claim 8, wherein the optical decoupling layer is configured to be transparent to the high-energy radiation quanta.

10. A radiation detector for combined detection of lower energy X-radiation and higher energy gamma radiation, the radiation detector having a multi-layered structure, comprising:
    a front scintillator layer configured to emit a burst of scintillation photons responsive to an X-radiation quantum being absorbed by the front scintillator layer;
    a front photosensor layer attached to a front side of the front scintillator layer, said front photosensor layer configured to detect scintillation photons generated in the front scintillator layer;
    a rear scintillator layer arranged in back of the front scintillation layer and configured to emit a burst of scintillation photons responsive to a gamma radiation quantum passing through the front scintillation layer and being absorbed by the rear scintillator layer;
    a rear photosensor layer coupled to a back side of the rear scintillator layer opposite to the front scintillation layer, said rear photosensor layer configured to detect scintillation photons generated in the rear scintillator layer; and
    an optical decoupling layer disposed between the front scintillator layer and the rear scintillator layer, the optical decoupling layer being integrally formed with the rear scintillator layer or the front scintillator layer.

11. The radiation detector according to claim 10, wherein the front photosensor layer and/or the rear photosensor layer comprise a foil substrate.

12. The radiation detector according to claim 1, wherein the rear photosensor layer comprises a photomultiplier, an avalanche photodiode or a silicon photomultiplier and/or the front photosensor layer comprises a thin-film-transistor detector, a CMOS active pixel sensor or a silicon photomultiplier.

13. The radiation detector according to claim 10, wherein the rear photosensor layer is attached to a back side of the rear scintillator layer via a light guide layer and/or the front photosensor layer is attached to a front side of the front scintillator layer via a light guide layer.

14. The radiation detector according to claim 13, wherein the radiation detector further comprises a collimator layer for collimating low-energy radiation quanta and high-energy radiation quanta, wherein the collimating layer is arranged in front of the front photosensor layer opposite the front scintillator layer.

15. The radiation detector according to claim 14 wherein the collimator layer comprises a two-dimensional array of apertures that extend in mutually orthogonal directions.

16. An imaging system, comprising an X-ray source and a radiation detector according to claim 1.

17. The imaging system according to claim 16, wherein the radiation detector is arranged such that the front photosensor layer is between the X-ray source and the front scintillator layer.

18. The radiation detector according to claim 10, wherein the rear photosensor layer comprises a two-dimensional array of pixels having a rear photosensor layer pixel pitch in each of the two dimensions, and wherein the front photosensor layer comprises a two-dimensional array of pixels having a front photosensor layer pixel pitch in each of the two dimensions, and wherein the rear photosensor layer pixel pitch is unequal to the front photosensor layer pixel pitch.

* * * * *